(12) United States Patent
Kim et al.

(10) Patent No.: US 11,820,318 B2
(45) Date of Patent: Nov. 21, 2023

(54) AIRBAG DEVICE AND CONTROL METHOD THEREOF

(71) Applicants: HYUNDAI MOTOR COMPANY, Seoul (KR); KIA CORPORATION, Seoul (KR)

(72) Inventors: Se Ho Kim, Seoul (KR); Eung Man Kim, Hwaseong-si (KR); Kap Seong Jung, Hwaseong-si (KR); Yong Tae Kim, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/876,483

(22) Filed: Jul. 28, 2022

(65) Prior Publication Data

US 2023/0134443 A1  May 4, 2023

(30) Foreign Application Priority Data

Nov. 2, 2021 (KR) .................. 10-2021-0148782

(51) Int. Cl.
*B60R 21/2338* (2011.01)
*B60R 21/015* (2006.01)

(52) U.S. Cl.
CPC .... *B60R 21/2338* (2013.01); *B60R 21/01512* (2014.10); *B60R 2021/23384* (2013.01)

(58) Field of Classification Search
CPC .......................................... B60R 2021/23384
See application file for complete search history.

(56) References Cited

U.S. PATENT DOCUMENTS

| 7,195,281 | B2 * | 3/2007 | Williams | ............ B60R 21/2338 |
| | | | | 280/743.2 |
| 7,784,828 | B2 * | 8/2010 | Matsu | .................... B60R 21/233 |
| | | | | 280/739 |
| 10,099,645 | B2 * | 10/2018 | Song | .................... B60R 21/2338 |
| 10,300,878 | B2 * | 5/2019 | Park | ....................... B60R 21/2171 |
| 11,110,883 | B1 * | 9/2021 | Deng | .................... B60R 21/264 |
| 2006/0290117 | A1 * | 12/2006 | Fischer | ................. B60R 21/276 |
| | | | | 280/739 |

(Continued)

FOREIGN PATENT DOCUMENTS

CN  112810564 A  *  5/2021
CN  113799725 A  *  12/2021

(Continued)

*Primary Examiner* — Nicole T Verley
(74) *Attorney, Agent, or Firm* — LEMPIA SUMMERFIELD KATZ LLC

(57) ABSTRACT

Disclosed is an airbag device which varies and deploys a shape of an airbag cushion according to an attitude of a seat and a posture of a passenger to safely protect the passenger. In particular, the airbag device includes: a first tether of which one end is connected to an airbag housing, a second tether which includes a first portion connected between the other end of the first tether and a front surface of the airbag cushion, and a second portion connected between the other end of the first tether and the airbag housing to have a margin length, and a tether cutter provided to cut the first tether and configured to perform one deployment mode of a first deployment mode and a second deployment mode according to whether first tether is cut.

9 Claims, 7 Drawing Sheets

(56) References Cited

U.S. PATENT DOCUMENTS

| | | | |
|---|---|---|---|
| 2017/0096118 A1* | 4/2017 | Kruse | B60R 21/0136 |
| 2018/0079382 A1* | 3/2018 | Yoo | B60R 21/233 |
| 2018/0304844 A1* | 10/2018 | Nagasawa | B60R 21/01512 |
| 2021/0387591 A1* | 12/2021 | Choi | B60R 21/2338 |

FOREIGN PATENT DOCUMENTS

| | | | |
|---|---|---|---|
| DE | 102006028510 A1 * | 2/2007 | |
| DE | 102007032763 A1 * | 1/2008 | |
| DE | 102018109382 A1 * | 10/2019 | |
| DE | 102019102372 A1 * | 7/2020 | |
| DE | 102019201443 A1 * | 8/2020 | |
| DE | 102019129912 A1 * | 5/2021 | |
| EP | 3530526 A1 * | 8/2019 | |
| JP | 2008044594 A * | 2/2008 | |
| KR | 20150115500 A | 10/2015 | |
| WO | WO-2007046740 A1 * | 4/2007 | |
| WO | WO-2021180659 A1 * | 9/2021 | |

* cited by examiner

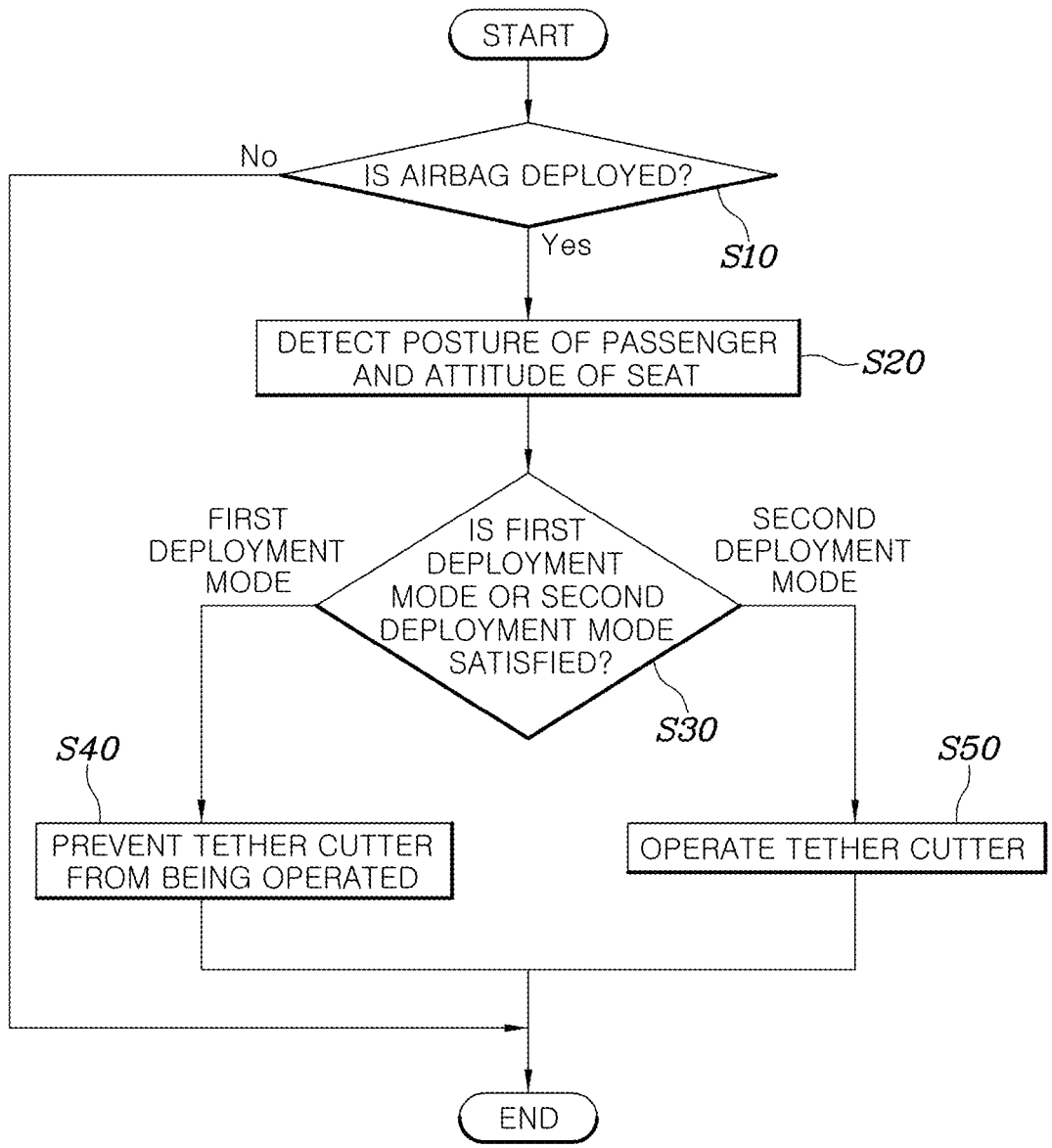

AIRBAG DEVICE AND CONTROL METHOD THEREOF

CROSS REFERENCE TO RELATED APPLICATION

This application claims priority to and the benefit of Korean Patent Application No. 10-2021-0148782, filed on Nov. 2, 2021, the entire contents of which are incorporated herein for all purposes by reference.

BACKGROUND

Field

The present disclosure relates to an airbag device, which varies and deploys a shape of an airbag cushion to safely protect the passenger, and a control method thereof.

Description of the Related Art

With the introduction of autonomous vehicles, a major change is expected in an interior of a vehicle. For example, the major change may include introduction of a slim cockpit, a long sliding, and a relaxation seat so as to improve indoor habitability of passengers.

In response to such indoor user experience (UX), we have found that an airbag capable of protecting passengers is desired when a collision occurs, while satisfying regulations/marketability/user usage conditions.

Such regulations/marketability are evaluated on the basis of a posture of a passenger who normally sits on a seat. However, we have discovered that in the case of the relaxation seat, because a distance between the cockpit and the passenger is increased, a technology is desired to protect passengers by increasing a length of a passenger airbag (PAB) cushion.

For example, when the PAB cushion is made of only one type so as to cope with a passenger far away from the cockpit, and when the airbag is deployed, since a volume of the PAB cushion is too large for the passenger seated in close proximity to the cockpit, another safety problem may occur.

In order to solve the above problem, since front and rear lengths of the PAB cushion are set on the basis of a passenger in close proximity to the cockpit, when a passenger is located close to the cockpit according to a normal seating posture of the passenger as shown in FIG. 1, the airbag is deployed normally so that a close passenger is loaded onto the PAB cushion.

On the other hand, when a passenger is located at a distance from the cockpit according to a long sliding/relax posture as shown in FIG. 2, it has been proposed a method of cutting a tether for regulating the front and rear shape of the PAB cushion to allow the PAB cushion to be loaded to the passenger from a long distance.

However, we have further found that when the tether is cut, the PAB cushion swells like a balloon so that it is difficult to control the shape of the PAB cushion and thus there is a problem in that a vertical movement of the PAB cushion becomes severe.

Accordingly, it is not possible to safely protect passengers, and a difficult problem occurs in responds to unbelt regulations of North America.

The foregoing is intended merely to aid in the understanding of the background of the present disclosure, and is not intended to mean that the present disclosure falls within the purview of the related art that is already known to those having ordinary skill in the art.

SUMMARY

The present disclosure proposes an airbag device which varies and deploys a shape of an airbag cushion according to an attitude of a seat and a posture of a passenger to safely protect the passenger, and a control method thereof.

According to one aspect of the present disclosure, an airbag device includes: a first tether of which one end is connected to an airbag housing, a second tether which includes a first portion connected between the other end of the first tether and a front surface of the airbag cushion, and a second portion connected between the other end of the first tether and the airbag housing to have a margin length, and a tether cutter provided to cut the first tether. In particular, the tether cutter is configured to perform a first deployment mode in which front and rear deployment lengths of the airbag cushion are relatively short or a second deployment mode in which the front and rear deployment lengths of the airbag cushion are relatively long according to whether the first tether is cut.

The first deployment mode may be implemented such that the first tether and the first portion of the second tether are expanded and deployed in a state in which the first tether is not cut. The second deployment mode may be implemented such that the first portion and the second portion of the second tether are expanded and deployed in a state in which the first tether is cut.

An end portion of the second portion may be divided toward a front side of the airbag cushion and connected to an inner surface of the airbag cushion.

The airbag device may further include: a sensor configured to detect a posture of the passenger seated on the seat and an attitude of the seat; and a controller configured to determine a deployment mode condition on the basis of a signal detected by the sensor and control a cutting operation of the tether cutter.

When a first deployment mode condition is satisfied, the controller may control the tether cutter to not perform the cutting operation, and when a second deployment mode condition is satisfied, the controller may control the tether cutter to perform the cutting operation.

When a current is applied to the tether cutter by the controller, since the tether cutter cuts the first tether, the second portion having a margin length by the first portion may be expanded and stretched in a length direction so that the airbag cushion is expanded and deployed forward.

The airbag device may further include a third tether connected between the second tether and the inner surface of the airbag cushion and configured to regulate a protrusion amount of a lower portion of the airbag cushion.

One end of the third tether may be connected to the second portion of the second tether, and the other end of the third tether may be connected to a lower surface of the airbag cushion.

According to another aspect of the present disclosure provides a control method of an airbag device that includes a first tether of which a first end connected to an airbag housing, a second tether having a first portion connected between a second end of the first tether and an inner surface of an airbag cushion and a second portion connected between the second end of the first tether and the airbag housing to have a margin length, a tether cutter to cut the first tether, and a controller to control the tether cutter. The control method includes: detecting, by the controller, a posture of a passenger seated on a seat and an attitude of the seat; determining, by the controller, a deployment mode condition based on a detected signal corresponding to a posture of the passenger seated on the seat and an attitude of the seat; and controlling, by the controller, a cutting operation of the tether cutter based on a determined deployment mode condition.

When a first deployment mode condition is satisfied, the controller may control the tether cutter to not perform a cutting operation. On the other hand, when a second deployment mode condition is satisfied, the controller may control the tether cutter to perform the cutting operation.

BRIEF DESCRIPTION OF THE DRAWINGS

The above and other objects, features and other advantages of the present disclosure should be more clearly understood from the following detailed description when taken in conjunction with the accompanying drawings, in which:

FIG. 7 is a flowchart illustrating a process of controlling an airbag device according to one embodiment of the present disclosure.

Figure 1:
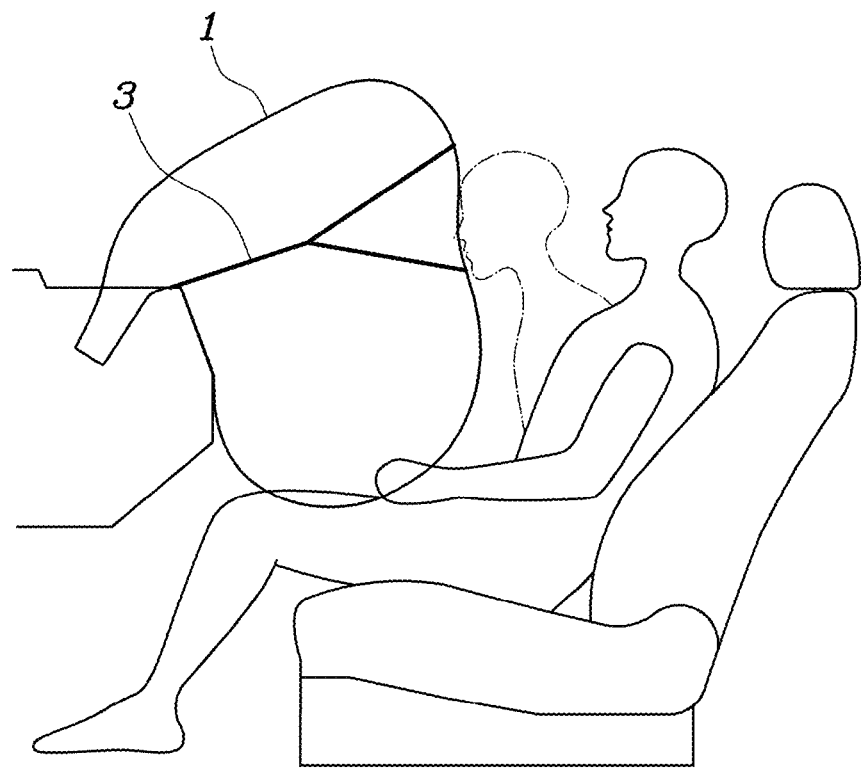
FIG. 1 is a diagram illustrating a state in which an airbag cushion is deployed when a distance between a passenger and the airbag cushion is close according to the related art.
Figure 2:
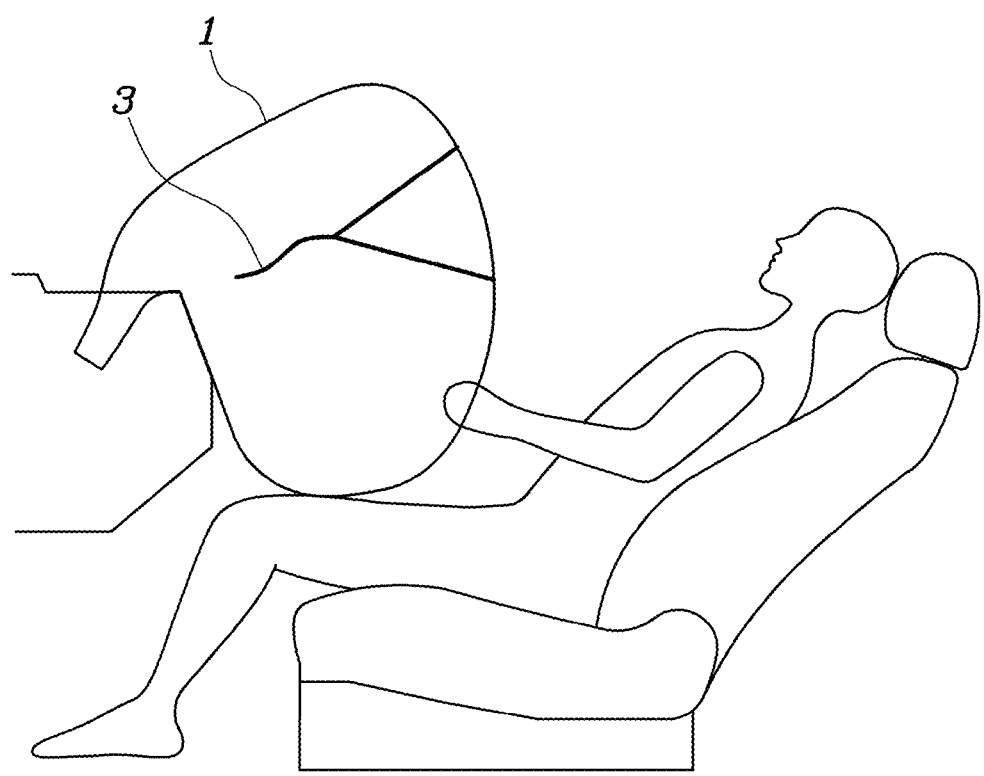
FIG. 2 is a diagram illustrating a state in which the airbag cushion is deployed when the distance between the passenger and the airbag cushion is long according to the related art.

The drawings described herein are for illustration purposes only and are not intended to limit the scope of the present disclosure in any way.

DETAILED DESCRIPTION

Specific structural and functional descriptions of the embodiments of the present disclosure disclosed in this disclosure or application are illustrative only for the purpose of describing the embodiments, and the embodiments according to the present disclosure may be implemented in various forms and should not be construed as being limited to embodiments described in this disclosure or application.

The embodiments according to the present disclosure may be variously modified and may have various forms, so that specific embodiments illustrated in the drawings and described in detail in this disclosure or application are not intended to limit the concept of the present disclosure to the disclosed specific embodiments. Instead, it includes all modifications, equivalents, and alternatives falling within the spirit and scope of the present disclosure.

The terms first, second, and the like may be used to describe various components, but the components should not be limited by these terms. These terms may be used only for the purpose of distinguishing one component from another component, and, for example, a first component may be referred to as a second element, and similarly, the second component may also be referred to as the first component without departing from the scope of the present disclosure.

When a component is referred to as being "connected," or "coupled" to another component, it may be directly connected or coupled to another component, but it should be understood that yet another component may exist between the component and another component. On the contrary, when a component is referred to as being "directly connected" or "directly coupled" to another, it should be understood that still another component may not be present between the component and another component. Other expressions describing the relationship between components, that is, "between" and "immediately between," or "adjacent to" and "directly adjacent to" should also be construed as described above.

The terms used herein are for the purpose of describing only specific embodiments and are not intended to limit the present disclosure. Unless the context clearly dictates otherwise, the singular form includes the plural form. In this disclosure, the terms "comprising," "having," or the like are used to specify that a feature, a number, a step, an operation, a component, an element, or a combination thereof described herein exists, and they do not preclude the presence or addition of one or more other features, numbers, steps, operations, components, elements, or combinations thereof.

When a component, device, element, or the like of the present disclosure is described as having a purpose or performing an operation, function, or the like, the component, device, or element should be considered herein as being "configured to" meet that purpose or to perform that operation or function.

Unless defined otherwise, all terms including technical or scientific terms used herein have the same meaning as commonly understood by those having ordinary skill in the art to which the present disclosure pertains. General terms that are defined in a dictionary shall be construed to have meanings that are consistent in the context of the relevant art and should not be interpreted as having an idealistic or excessively formalistic meaning unless clearly defined in this present disclosure.

Exemplary embodiments of the present disclosure are described in detail below with reference to the accompanying drawings.

Figure 3:
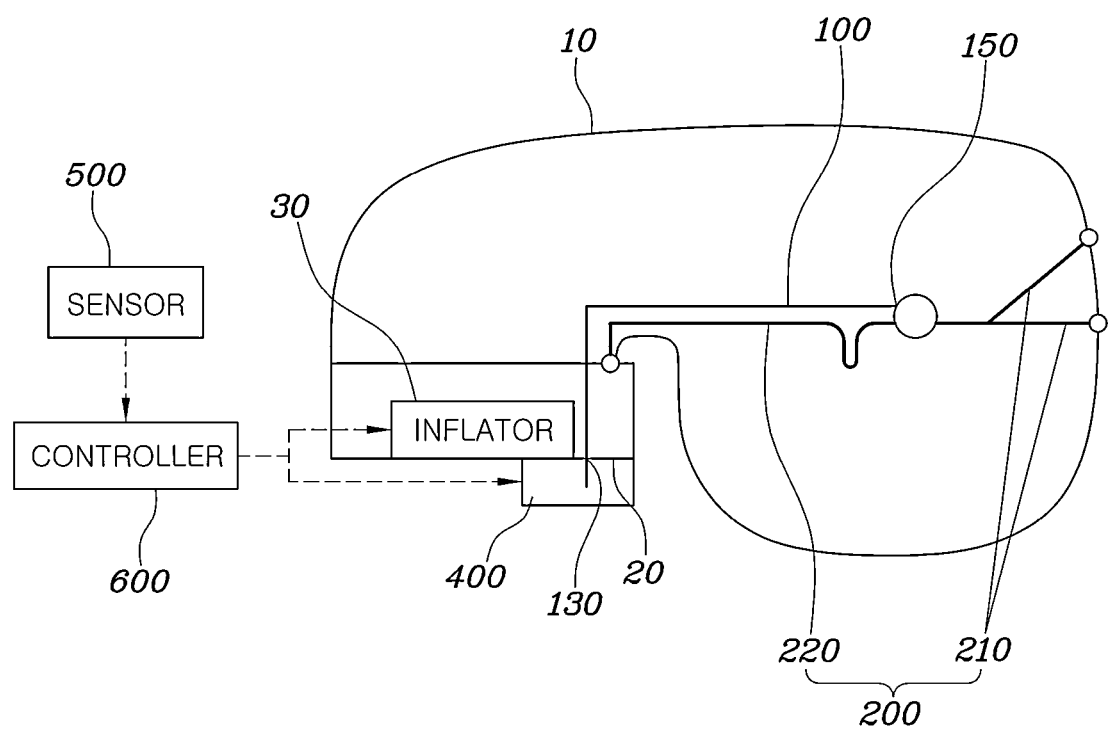
FIG. 3 is a diagram illustrating a state in which an airbag cushion is deployed when a distance between a passenger and the airbag cushion is close according to one embodiment of the present disclosure.
Figure 4:
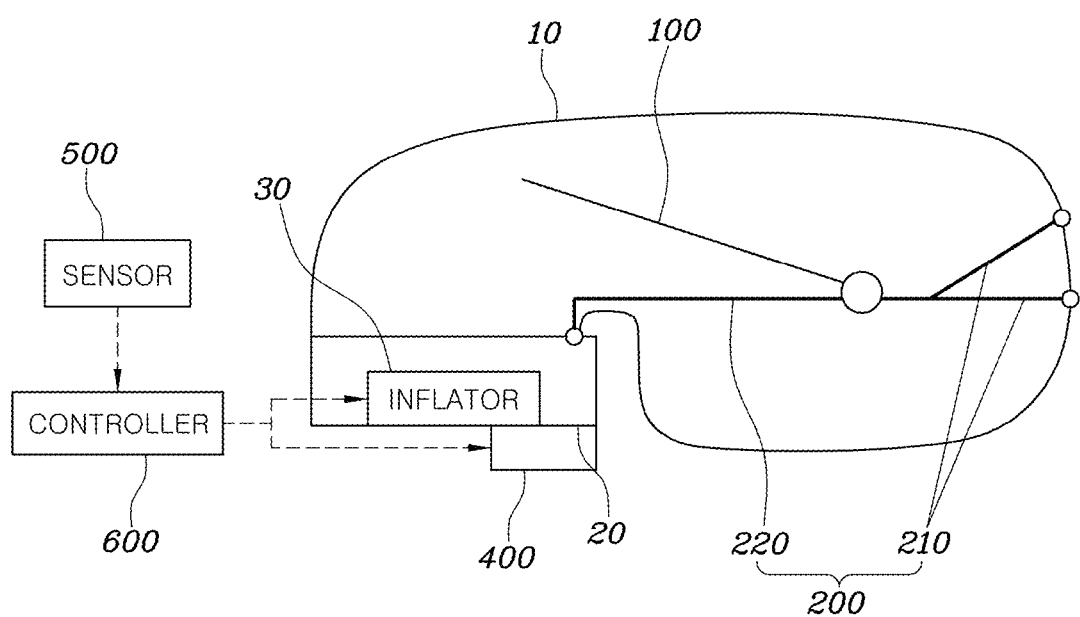
FIG. 4 is a diagram illustrating a state in which the airbag cushion is deployed when the distance between the passenger and the airbag cushion is long according to one embodiment of the present disclosure.

FIG. 3 is a diagram illustrating a state in which an airbag cushion 10 is deployed when a distance between a passenger and the airbag cushion 10 is close according to one embodiment of the present disclosure, and FIG. 4 is a diagram illustrating a state in which the airbag cushion 10 is deployed when the distance between the passenger and the airbag cushion 10 is long according to another embodiment of the present disclosure.

An airbag device in one form of the present disclosure may be a passenger airbag mounted in a cockpit.

Referring to FIGS. 3 and 4, the airbag device includes: a first tether 100 of which one end 130 is connected to an airbag housing 20; a second tether 200 including: a first portion 210 is connected between the other end 150 of the first tether 100 and a front surface of the airbag cushion 10, and a second portion 220 connected between the other end 150 of the first tether 100 and the airbag housing 20 to have a margin length; and a tether cutter 400 provided to cut the first tether 100. In particular, the tether cutter 400 is configured to perform one deployment mode among a first deployment mode and a second deployment mode. In the first deployment mode, front and rear deployment lengths of the airbag cushion 10 is relatively short, whereas in the second deployment mode, the front and rear deployment lengths of the airbag cushion 10 is relatively long, according to whether the first tether 100 is cut or not.

For example, the airbag housing 20 is built in the cockpit located in a front side of a vehicle interior, and an inflator 30 and the airbag cushion 10 are provided in the airbag housing 20.

In addition, as the airbag cushion 10 is filled with a gas generated from the inflator 30 when an airbag is deployed, the airbag cushion 10 is expanded and deployed toward the passenger, and the first tether 100 and the second tether 200 are connected forward and backward in the airbag cushion 10 to form a deployed shape of the airbag cushion 10.

Specifically, a rear end of the second tether 200 is connected to an end portion of the airbag housing 20, and a front end of the second tether 200 is sewn to an inner surface of a front end of the airbag cushion 10.

In addition, a rear end of the first tether 100 is sewn to an intermediate portion of the second tether 200, that is, between the first portion 210 and the second portion 220 of the second tether 200 so that the first tether 100 and the second tether 200 are connected.

In addition, the tether cutter 400 is mounted below the airbag housing 20, and a front end of the first tether 100 is connected to the tether cutter 400.

In particular, since the front end of the first tether 100 is connected to the intermediate portion of the second tether 200, when a length of the first tether 100 is formed to be short, the first tether 100 is in a state of holding the intermediate portion of the second tether 200 so that the first portion 210 of the second tether 200 is connected in a taut state, whereas the second portion 220 has a margin length and is connected in a sagged state.

In addition, the tether cutter 400 is formed to be capable of cutting the front end of the first tether 100, thereby selectively cutting the first tether 100 according to a deployment mode.

Accordingly, when the airbag is deployed, and when the passenger is normally seated on the seat or a distance between the airbag cushion 10 and the passenger is close, the airbag is deployed without operating the tether cutter 400.

In this case, since the airbag cushion 10 is deployed in a state in which the first tether 100 holds the intermediate portion of the second tether 200, the front and rear lengths of the airbag cushion 10 toward the passenger is reduced by as much as the sagged margin length of the second portion 220 and a front volume is suppressed so that a passenger located in close proximity to the airbag cushion 10 is safely protected.

On the other hand, when the airbag is deployed, and when the passenger is seated in a relaxation mode or the distance between the airbag cushion 10 and the passenger is long, the airbag is deployed in a state of operating the tether cutter 400.

In this case, since the first tether 100 is cut and thus the second portion 220 of the second tether 200 having a margin length is expanded by the first tether 100, a length of the airbag cushion 10 toward the passenger is extended by as much as the expanded length of the second portion 220. Thus a passenger located far away from the airbag cushion 10 is early restrained on the airbag cushion 10 so that the passenger is safely protected.

In addition, when the passenger is seated normally or the distance between the passenger and the airbag cushion 10 is short, the airbag cushion 10 is deployed in first deployment mode, whereas when the passenger is seated in the relaxation mode or the distance between the passenger and the airbag cushion 10 is long, the airbag cushion 10 is deployed in the second deployment mode.

Accordingly, the first deployment mode is implemented such that the first tether 100 and the first portion 210 of the second tether 200 are expanded and deployed in a state in which the first tether 100 is not cut. The second deployment mode is implemented such that first portion 210 and the second portion 220 of the second tether 200 are expanded and deployed in a state in which the first tether 100 is cut.

That is, when the first tether 100 is not cut in the first deployment mode, the first tether 100 is tightly deployed between the front surface of the airbag cushion 10 and the airbag housing 20 by as much as the sum of the length of the first tether 100 and the length of the first portion 210 of the second tether 200, and thus the front and rear lengths of the airbag cushion 10 are reduced relatively short.

However, because the first tether 100 is cut in the second deployment mode, the second portion 220 of the second tether 200 is expanded instead of the first tether 100. Accordingly, the second tether 200 is tightly deployed between the front surface of the airbag cushion 10 and the airbag housing 20 by as much as the sum of the lengths of the first portion 210 and the second portion 220 of the second tether 200. Thus, the front and rear lengths of the airbag cushion 10 is extended by as much as the margin length of the second portion 220.

In another embodiment of the present disclosure, an end portion of the second portion 220 may be divided toward the front side of the airbag cushion 10 to be connected to an inner surface of the airbag cushion 10.

For example, the second portion 220 is divided into two or more portions, and front ends of the divided second portion 220 are respectively sewn to the inner surface of the airbag cushion 10.

In particular, because the front ends of the second portion 220 are sewn to the inner surface of the airbag cushion 10 in a vertical direction or a lateral direction, it is possible to adjust the shape of the airbag according to a position at which the second portion 220 is sewn.

Meanwhile, referring to FIGS. 3 and 4, the airbag device further includes: a sensor 500 for detecting a posture of a passenger seated on a seat and an attitude of the seat, and the controller 600 that determines a deployment mode condition on the basis of a signal detected by the sensor 500 and controls a cutting operation of the tether cutter 400.

Specifically, the sensor 500 includes a photographing part such as a camera mounted in the vehicle interior to capture a passenger and includes various sensors installed in the seat to detect an angle, a load, and a position of the seat. The sensor 500 may sense a seating posture of the passenger and an attitude of the seat, including whether the passenger is seated.

In addition, the controller 600 may determine whether a vehicle collision signal is input and the airbag is deployed. In particular, the controller 600 may determine whether signals sensed by the sensor 500 are input and a current airbag deployment mode satisfies a first deployment mode condition or a second deployment mode condition.

In addition, when the airbag is determined as being deployed, the controller 600 may control to apply a current to the inflator 30, thereby deploying the airbag. And when the controller 600 determines that an operation of the tether cutter 400 is necessary according to the deployment mode condition, the controller 600 may further control to apply a current to the tether cutter 400, thereby operating the tether cutter 400.

Specifically, when the first deployment mode condition is satisfied, the controller 600 controls the tether cutter 400 to not perform a cutting operation, and when the second deployment mode condition is satisfied, the controller 600 controls the tether cutter 400 to perform the cutting operation.

For example, when the distance between the passenger and the airbag cushion 10 is short, the first deployment mode condition is satisfied, and thus the controller 600 reduces the front and rear lengths of the airbag cushion 10 to be relatively short and deploys the airbag. When the distance between the passenger and the airbag cushion 10 is long, the second deployment mode condition is satisfied, and thus the controller 600 extends the front and rear lengths of the airbag cushion 10 to be relatively long and deploys the airbag.

The configuration in which the airbag cushion 10 is deployed according to the operation of the tether cutter 400 is further described in detail herein. When a current is applied to the tether cutter 400 by the controller 600, as the tether cutter 400 cuts the first tether 100, the second portion 220 having a margin length by the first portion 210 is expanded and stretched in a longitudinal direction so that the airbag cushion 10 may be expanded and deployed forward.

In one embodiment, the controller 600 may be an airbag controller which controls an airbag device. The controller 600 according to an embodiment of the present disclosure may be implemented through an algorithm configured to control operations of various components of the vehicle, a non-volatile memory (not shown) configured to store data relating to software commands to reproduce the algorithm, or a processor (not shown) configured to perform operations, which is described below, using data stored in a corresponding memory. Here, the memory and the processor may be implemented as separate chips. Alternatively, the memory and the processor may be implemented as a single chip in which the memory and the processor are integrated. The processor may be in the form of one or more processors.

Figure 5:
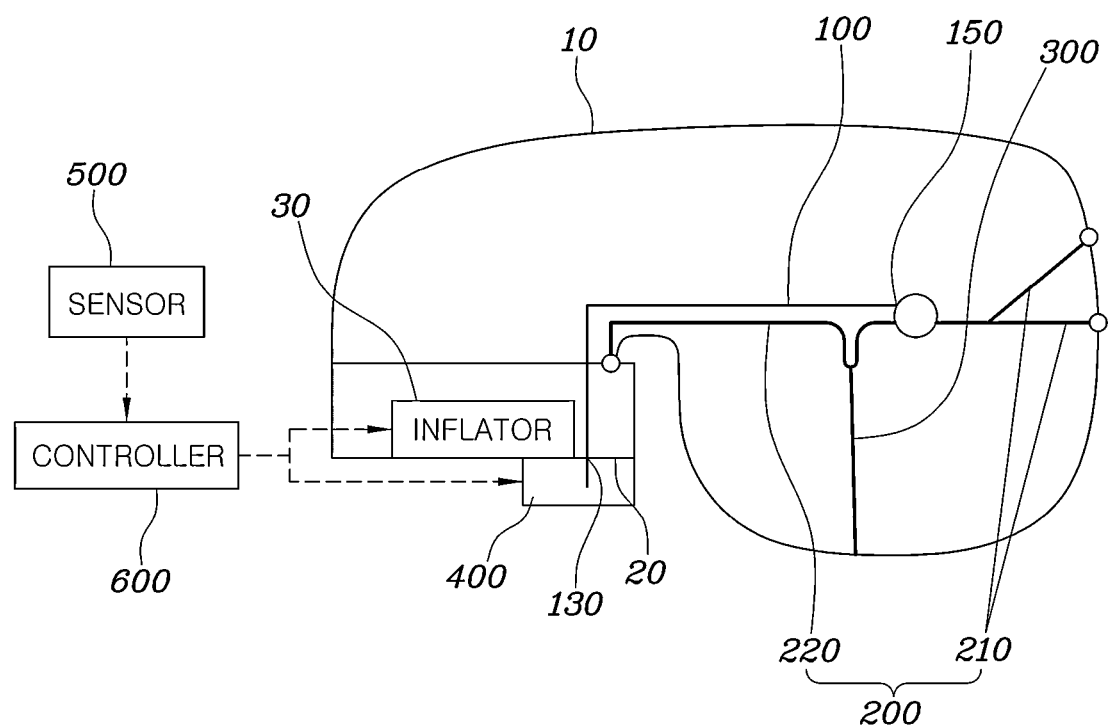
FIG. 5 is a diagram illustrating an embodiment in which a third tether is connected in FIG. 3.
Figure 6:
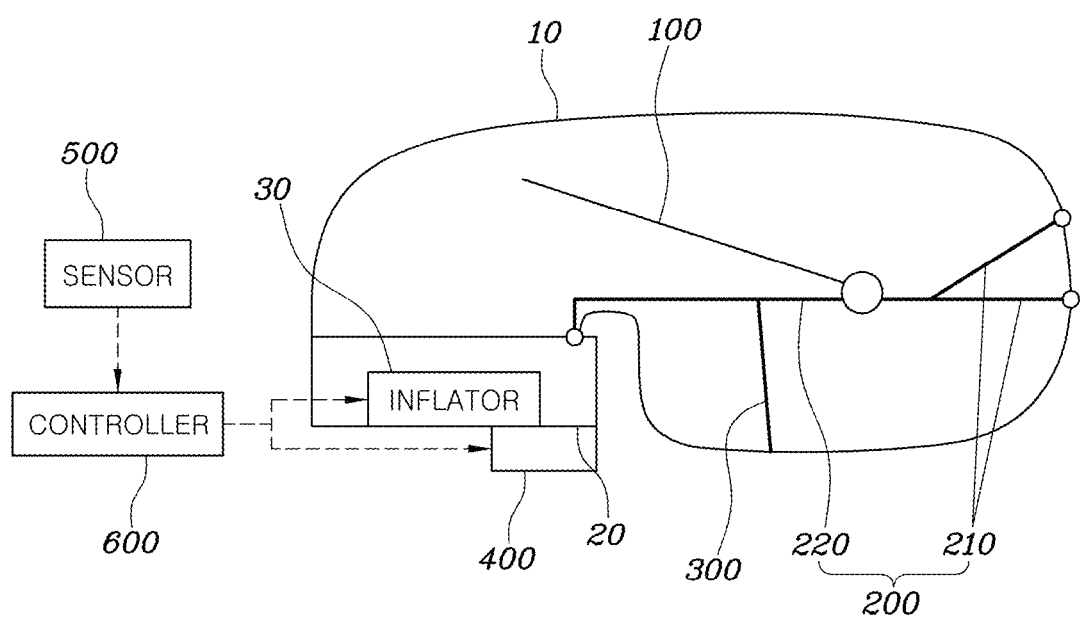
FIG. 6 is a diagram illustrating an embodiment in which the third tether is connected in FIG. 4.

Meanwhile, FIG. 5 is a diagram illustrating an embodiment in which a third tether 300 is connected in FIG. 3, and FIG. 6 is a diagram illustrating an embodiment in which the third tether 300 is connected in FIG. 4 that shows a structure in which the third tether 300 is further connected to an inside of the airbag cushion 10.

Referring to FIGS. 5 and 6, the airbag device further includes the third tether 300 connected between the second tether 200 and the inner surface of the airbag cushion 10 and configured to regulate a protrusion amount of a lower portion of the airbag cushion 10.

Specifically, one end of the third tether 300 is connected to the second portion 220 of the second tether 200, and the other end thereof is connected to a lower surface of the airbag cushion 10.

Accordingly, when the airbag is deployed and the first deployment mode is satisfied, the airbag is deployed without operating the tether cutter 400.

In this case, because the airbag cushion 10 is deployed in a state in which the first tether 100 holds the intermediate portion of the second tether 200, the front and rear lengths of the airbag cushion 10 toward the passenger are reduced by as much as the sagged margin length of the second portion 220 and a front volume is suppressed so that a passenger located in close proximity to the airbag cushion 10 is safely protected.

In particular, the third tether 300 is connected to the second portion 220 and the lower surface of the airbag cushion 10 and expanded to limit extension of a lower end portion of the airbag cushion 10 to be long downward, thereby controlling a vertical movement of the airbag cushion 10.

On the other hand, when the airbag is deployed and the second deployment mode is satisfied, the airbag is deployed in a state in which the tether cutter 400 is operated.

In this case, because the first tether 100 is cut and thus the second portion 220 of the second tether 200 having a margin length is expanded by the first tether 100, front and rear lengths of the airbag cushion 10 toward the passenger is extended by as much as the expanded length of the second portion 220. Thus, a passenger located far away from the airbag cushion 10 is early restrained on the airbag cushion 10 so that the passenger is safely protected.

In particular, because a lower end of the third tether 300 is moved upward as the second portion 220 is expanded, a lower volume of the airbag cushion 10 is converted into a front protrusion amount of the airbag cushion 10 so that the passenger far away from the airbag cushion 10 is more safely and quickly restrained.

Meanwhile, FIG. 7 is a flowchart illustrating a process of controlling an airbag device according to another embodiment of the present disclosure.

Referring to FIG. 7, a control method of an airbag device of the present disclosure includes: detecting operation of, by the controller 600, detecting a posture of a passenger seated on a seat and an attitude of the seat, and control operation of, by controller 600, determining a deployment mode condition on the basis of a detected signal and controlling a cutting operation of the tether cutter 400.

Thus, when the first deployment mode condition is satisfied, the controller 600 may control the tether cutter 400 to not perform a cutting operation, and when the second deployment mode condition is satisfied, the controller 600 may control the tether cutter 400 to perform the cutting operation.

Hereinafter, a process of controlling the airbag device according to the present disclosure is generally described with reference to FIG. 7.

When a collision accident occurs during vehicle driving, a collision signal is sensed by a collision detection sensor mounted in the vehicle, and when the sensed collision signal is input, it is determined whether the airbag is deployed on the basis of the input collision signal (S10).

As the determination result in S10, when an airbag deployment is required, a seating posture of the passenger and an attitude of the seat are sensed by the sensor 500 and input to the controller 600 (S20).

Accordingly, on the basis of the signal input to the controller 600, a deployment mode condition which is satisfied of the first deployment mode condition and the second deployment mode condition is determined (S30).

As the determination result in S30, when the passenger is normally seated on the seat and thus a distance between the passenger and the airbag cushion 10 is relatively short, or when the distance between the passenger and the airbag cushion 10 is short even when the seat faces a rear side, it is determined that the first deployment mode condition is satisfied, and thus the tether cutter 400 is controlled to not be operated (S40).

Thus, since the airbag cushion 10 is deployed without operating the tether cutter 400, the airbag cushion 10 is deployed in a state in which the first tether 100 holds the intermediate portion of the second tether 200. Accordingly, since the front and rear lengths of the airbag cushion 10 toward the passenger are reduced by as much as the sagged margin length of the second portion 220, the front volume is suppressed, and thus a passenger located in close proximity to the airbag cushion 10 is safely protected.

On the other hand, as the determination result in S30, when the passenger is normally seated on the seat but the distance between the passenger and the airbag cushion 10 is relatively long, and when the seat faces the rear side and the distance between the passenger and the airbag cushion 10 is long, and when a current mode is a relaxation seating mode, it is determined that the second deployment mode condition is satisfied, and thus the tether cutter 400 is controlled to be operated (S50).

Accordingly, when the airbag cushion 10 is deployed in a state in which the tether cutter 400 is operated, the first tether 100 is cut and the second portion 220 of the second tether 200 having a margin length is expanded by the first tether 100.

Therefore, the front and rear lengths of the airbag cushion 10 toward the passenger are extended by as much as the expanded length of the second portion 220, and thus the passenger located at a far distance from the airbag cushion 10 is early restrained by the airbag cushion 10 so that the passenger is safely protected.

As described above, according to the present disclosure, since the length of the tether, which serves to control the shape of the airbag cushion 10 according to the attitude of the seat and the posture of the passenger, is changed to deploy the airbag cushion 10 in the form that the front and rear lengths of the airbag cushion 10 are reduced or expanded, the passenger as well as the posture and position of the passenger are quickly restrained regardless of the distance between the passenger and the airbag cushion 10 so that the passenger is safely protected.

In accordance with the present disclosure, since a length of a tether, which serves to control a shape of an airbag cushion according to an attitude of a seat and a posture of a passenger, is changed to deploy an airbag cushion in the form that front and rear lengths of the airbag cushion are reduced or expanded, the passenger as well as the posture and position of the passenger are quickly restrained regardless of a distance between the passenger and the airbag cushion so that there is an effect of safely protecting the passenger.

Meanwhile, although the present disclosure has been described in detail with respect to only the above described specific examples, it is obvious to those having ordinary skill in the art that various modifications and alternations are possible within the technical scope of the present disclosure, and it is natural that such modifications and alternation fall within the present disclosure.

What is claimed is:

1. An airbag device, comprising:
   a first tether including a first end connected to an airbag housing;
   a second tether including:
     a first portion connected between a second end of the first tether and an inner surface of an airbag cushion, and
     a second portion connected between the second end of the first tether and the airbag housing to have a margin length;
   a tether cutter configured to cut the first tether and perform a first deployment mode in which front and rear deployment lengths of the airbag cushion are relatively short or a second deployment mode in which the front and rear deployment lengths of the airbag cushion are relatively long; and
   a third tether connected between the second tether and the inner surface of the airbag cushion and configured to regulate a protrusion amount of a lower portion of the airbag cushion.

2. The airbag device of claim 1, wherein:
   the first deployment mode is implemented such that the first tether and the first portion of the second tether are expanded and deployed in a state in which the first tether is not cut; and
   the second deployment mode is implemented such that the first portion and the second portion of the second tether are expanded and deployed in a state in which the first tether is cut.

3. The airbag device of claim 1, wherein an end portion of the second portion is divided toward a front side of the airbag cushion and connected to an inner surface of the airbag cushion.

4. The airbag device of claim 1, further comprising:
   a sensor configured to detect a posture of a passenger seated on a seat and an attitude of the seat; and
   a controller configured to determine a deployment mode condition based on a signal detected by the sensor and control a cutting operation of the tether cutter.

5. The airbag device of claim 4, wherein:
   when a first deployment mode condition is satisfied, the controller is configured to control the tether cutter to not perform the cutting operation; and
   when a second deployment mode condition is satisfied, the controller is configured to control the tether cutter to perform the cutting operation.

6. The airbag device of claim 1, wherein, when a current is applied to the tether cutter by a controller, the tether cutter cuts the first tether, and the second portion having a margin length by the first portion is expanded and stretched in a length direction so that the airbag cushion is expanded and deployed forward.

7. The airbag device of claim 1, wherein:
   a first end of the third tether is connected to the second portion of the second tether; and
   a second end of the third tether is connected to a lower surface of the airbag cushion.

8. A control method for controlling an airbag device: the airbag device including a first tether of which a first end connected to an airbag housing, a second tether having a first portion connected between a second end of the first tether and an inner surface of an airbag cushion and a second portion connected between the second end of the first tether and the airbag housing to have a margin length, a tether cutter to cut the first tether, and a controller to control the tether cutter, the control method comprising:
   providing a third tether connected between the second tether and the inner surface of the airbag cushion to regulate a protrusion amount of a lower portion of the airbag cushion;
   detecting, by the controller, a posture of a passenger seated on a seat and an attitude of the seat;
   determining, by the controller, a deployment mode condition based on a detected signal corresponding to a posture of the passenger seated on the seat and an attitude of the seat; and
   controlling, by the controller, a cutting operation of the tether cutter based on a determined deployment mode condition.

9. The control method of claim 8, further comprising:
when a first deployment mode condition is satisfied, controlling, by the controller, the tether cutter to not perform the cutting operation; and
when a second deployment mode condition is satisfied, controlling, by the controller, the tether cutter to perform the cutting operation.

\* \* \* \* \*